United States Patent [19]

Torii et al.

[11] Patent Number: 5,249,479
[45] Date of Patent: Oct. 5, 1993

[54] WRIST MECHANISM FOR AN INDUSTRIAL ROBOT

[75] Inventors: Nobutoshi Torii, Hachioji; Hitoshi Mizuno; Kyozi Iwasaki, both of Yamanashi, all of Japan

[73] Assignee: Fanuc Ltd., Yamanashi, Japan

[21] Appl. No.: 841,208

Related U.S. Application Data

[63] Continuation of Ser. No. 476,491, Jun. 7, 1990, filed as PCT/JP89/01084, Oct. 23, 1989, abandoned.

[30] Foreign Application Priority Data

Oct. 24, 1988 [JP] Japan .............................. 63-266222

[51] Int. Cl.$^5$ .............................................. B25J 17/02
[52] U.S. Cl. ........................... 74/479 R; 74/471 XY; 74/500.5; 901/28; 901/15; 901/43; 285/274
[58] Field of Search ............ 74/471 XY, 479, 500.5; 901/22, 29, 28, 43, 42, 15; 285/136, 152, 273, 274

[56] References Cited

U.S. PATENT DOCUMENTS

| | | | |
|---|---|---|---|
| 2,344,108 | 3/1944 | Roselund | 901/28 |
| 3,155,240 | 11/1964 | Eude et al. | 901/28 |
| 3,606,162 | 9/1971 | Lehmann et al. | 901/43 |
| 4,149,278 | 4/1979 | Wiker et al. | 901/29 |
| 4,378,959 | 4/1983 | Susnjara | 901/43 |
| 4,489,624 | 12/1984 | Schaib et al. | 74/479 |
| 4,577,085 | 3/1986 | Burgher et al. | 901/42 |
| 4,626,004 | 12/1986 | Geberth, Jr. | 285/274 |
| 4,648,782 | 3/1987 | Kraft | 901/22 |
| 4,662,814 | 5/1987 | Suzuki et al. | 901/28 X |
| 4,704,065 | 11/1987 | Allared | 901/28 X |
| 4,705,243 | 11/1987 | Hartmann et al. | 901/15 |
| 4,729,253 | 3/1988 | Rosheim | 901/29 X |
| 4,767,257 | 8/1988 | Kato | 901/28 |
| 4,904,148 | 2/1990 | Larsson | 901/28 |
| 4,922,755 | 5/1990 | Oshiro et al. | 901/29 |

FOREIGN PATENT DOCUMENTS

| | | |
|---|---|---|
| 0136289 | 9/1983 | Japan . |
| 61-297093 | 12/1986 | Japan . |
| WO9008632 | 8/1990 | PCT Int'l Appl. ............. 414/918 |
| 0512048 | 7/1976 | U.S.S.R. ............. 901/22 |

Primary Examiner—Carl D. Friedman
Assistant Examiner—Winnie Yip
Attorney, Agent, or Firm—Nikaido, Marmelstein, Murray & Oram

[57] ABSTRACT

A wrist mechanism comprising a pipe 52 extended in relation to a front α-axis among the three axes of motion (α-axis, β-axis, γ-axis) of a wrist, on a center axis A—A of turning motion through the center of an α-axis reduction gear, a universal pipe coupling 61 provided in relation to a β-axis on the center axis B—B of motion, a pipe 51 having one end connected to the pipe 52 and the other end connected to the pipe coupling 61, and a hose 4 extended along a support arm 3 and connected through the pipe coupling 61 to the pipe 51. The wrist mechanism is incorporated into a robot for work in which a fluid is used, such as an application of an adhesive and sealant.

5 Claims, 1 Drawing Sheet

WRIST MECHANISM FOR AN INDUSTRIAL ROBOT

This application is a continuation of application Ser. No. 07/476.491, filed Jun. 7, 1990, filed as PCT/JP89/01084, Oct. 23, 1989, now abandoned.

DESCRIPTION

1. Technical Field

The present invention relates to a wrist mechanism of a three-axis wrist for an industrial robot which carries out work in which a fluid is used, such as the application of an adhesive and a sealant.

2. Background Art

FIG. 2 is a perspective view of a wrist unit employed in a conventional sealing robot. As shown in FIG. 2, a liquid material is supplied through a hose 4 to a sealing gun 8 held on an extremity of the wrist unit. The hose 4 is extended along the outer surface of a U arm 3, and a portion of the hose 4 near the wrist unit is bound to the U arm with a tape with a large slack zone R formed near the wrist unit so that the hose 4 can flex in accordance with the motion of the wrist unit.

While the robot is in operation, a wrist H executes a $\gamma$-rotation about the axis of the U arm 3 and a $\beta$-swing about an axis B—B, and the sealing gun 8 executes an $\alpha$-rotation about an axis A—A to apply a sealant.

Accordingly, the hose is torn, creased and damaged because the portion of the hose near the extremity of the wrist unit is undulated. Also, since the large slack zone R is formed in the hose, to enable the hose to flex in accordance with the motion of the wrist unit about three axes, i.e., the $\alpha$-axis, $\beta$-axis and $\gamma$-axis, the motion of the wrist unit is subject to spatial restrictions, to avoid interference between the hose and peripheral equipment, and such an arrangement is undesirable from the viewpoint of safety control.

DISCLOSURE OF THE INVENTION

As shown in FIG. 1, by way of example, a pipe 52 is extended in alignment with a center axis A—A of rotation through the center of an $\alpha$-axis reduction gear 19 in relation to an $\alpha$-axis among the three axes of the wrist unit 3, a pressure-tight universal pipe coupling 61 is provided on the center axis B—B of motion in relation to a $\beta$-axis, a pipe 51 is extended from the universal pipe coupling to the center axis A—A and is connected to the pipe 52, a hose 4 extended along a U arm or support arm 3 is connected through the universal pipe coupling 61 to the pipe 51, a hose 41 is connected to a pressure-tight universal pipe coupling 62 joined to the extremity of the pipe 52, and the rear end of the U arm 3 is turned to produce the $\gamma$-axis turning motion of a wrist H.

Since the U arm turns in a $\gamma$-axis turning motion, the portion of the hose 4 near the wrist unit is not affected by the $\gamma$-axis turning motion, and since the universal pipe coupling 61 provided on the center axis B—B of swing motion turns as the wrist unit performs a $\beta$-axis swing motion, the hose 4 and the pipe 51 are under no strain. Further, since the pipe 52 is extended on the axis A—A, the pipe 52 is under no strain when the wrist unit performs an $\alpha$-axis turning motion. The universal pipe coupling 62 turns as a sealing gun, not shown, mounted on a flange 7 performs an $\alpha$-axis turning motion, to enable the hose 41 to follow the movement of the sealing gun.

Since the pressure piping for the user is provided within the wrist unit, the hose is not undulated during the operation of the wrist unit, and thus tearing, creasing and damaging of the hose are prevented.

Furthermore, since the hose need not be provided with a large amount of slack R (FIG. 2) at the portion thereof near to the wrist unit, the possibility of interference of the hose with peripheral equipment and the operator is reduced.

BEST MODE OF CARRYING OUT THE INVENTION

Figure 1:
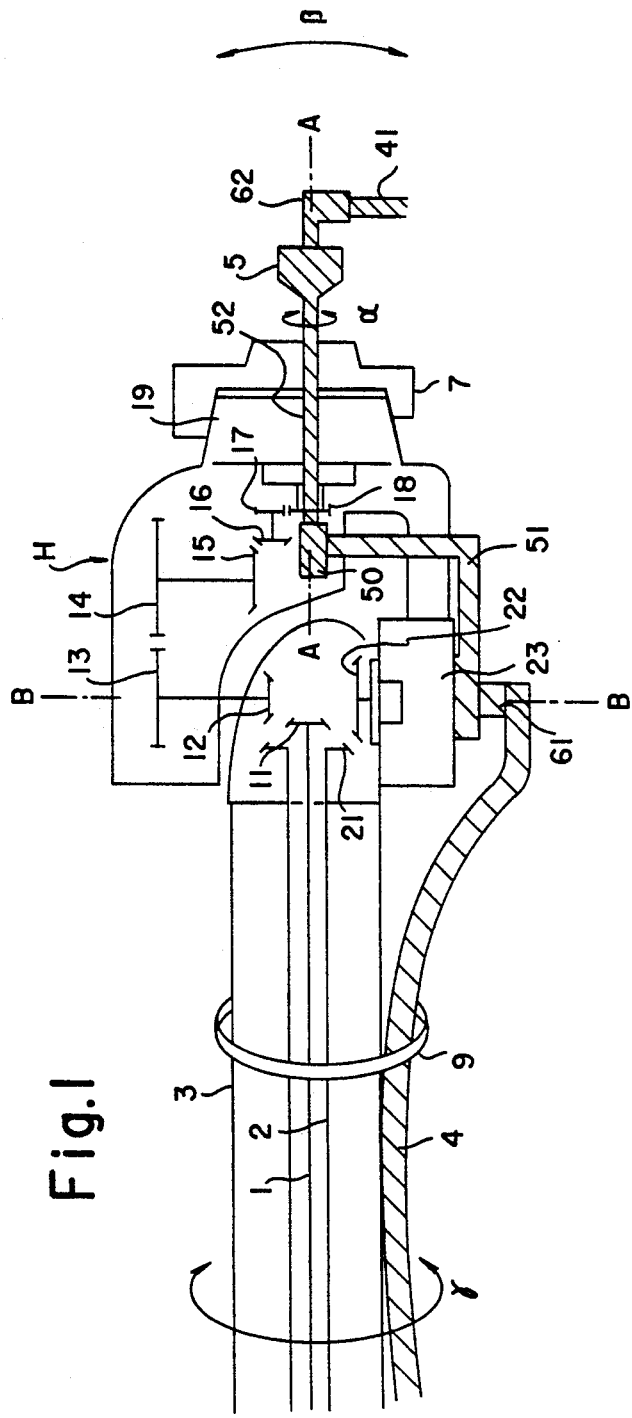
FIG. 1 is an explanatory view of a robot wrist unit embodying the present invention.
Figure 2:
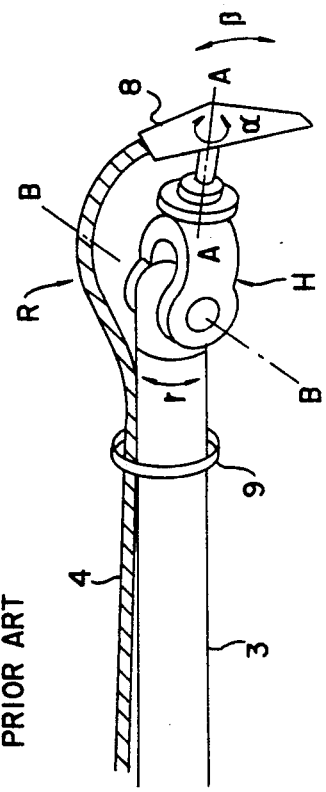
FIG. 2 is a perspective view of a conventional robot wrist unit.

As shown in FIG. 1, a three-axis wrist driving mechanism or pipe moving means is constructed by extending drive shaft means in form of an $\alpha$-drive shaft 1 within a support arm 3 and coaxially therewith, extending another drive shaft means in the form of a hollow $\beta$-drive shaft 2 coaxially with the $\alpha$-drive shaft 1 to receive the latter therein, interlocking the $\alpha$-drive shaft 1 with an $\alpha$-axis reduction gear 19 provided on the free end of a wrist through a first bevel gear train including a bevel gear 11 attached to the front end of the $\alpha$-drive shaft 1 and a bevel gear 12 meshed with the bevel gear 11, a first spur gear train including spur gears 13 and 14, a second bevel gear train including bevel gears 15 and 16 and a second spur gear train including spur gears 17 and 18, interlocking the $\beta$-drive shaft 2 with a $\beta$-axis reduction gear 23 provided on one side of the wrist through a bevel gear train including bevel gears 21 and 22, and supporting the rear end of the support arm on a support for the $\gamma$-axis turning motion.

A metallic pipe 52 is extended on the axis A—A of the $\alpha$-turning motion through the respective centers of the $\alpha$-axis reduction gear 19, an $\alpha$-axis flange 7 connected to the $\alpha$-axis reduction gear 19 to hold a sealing gun, not shown, and the spur gear 18, i.e., the input gear of the $\alpha$-axis reduction gear. A pressure-tight universal pipe coupling 61 is attached to the outer surface of the side wall of a wrist H, on an axis B—B. A metallic pipe 51 has one end joined to the pressure-tight universal coupling 61 and the other end joined to a coupling 50 joined to the inner end of the pipe 52. The free end of a hose 4 connected to a material source, not shown, is connected to the universal pipe coupling 61. A connecting hose 41 has one end connected to a pressure-tight universal pipe coupling 62 attached to a flange 5 joined to the outer end of the pipe 52, and the other end connected to the sealing gun, not shown, attached to the $\alpha$-axis flange 7.

The extremity of the hose 4 is bound to the support arm 3 with a tape 9.

In a wrist mechanism thus constructed, the universal pipe coupling 61 turns for a $\beta$-axis swing motion, the pipe 52 is not displaced during the $\alpha$-axis turning motion because the pipe 52 is extended on the axis of $\alpha$-axis turning motion, the universal pipe coupling 62 turns for the $\alpha$-axis turning motion of the sealing gun mounted on the $\alpha$-axis flange 7, to enable the connecting hose 41 to follow the movement of the sealing gun, and the support arm turns on its rear end for the $\gamma$-axis turning motion of the wrist. Thus, the extremity of the hose 4 is not displaced for the three-axis operation of the wrist unit.

Although the universal pipe coupling 61 is disposed on the outer surface of the wall of the wrist in this embodiment, to facilitate the connection and disconnection of the hose and the universal pipe coupling 61, the universal pipe coupling 61 may be disposed at any suitable position for the same purpose provided that the universal pipe coupling 61 is coaxial with the axis B—B of β-axis swing motion.

Furthermore, the hose is not subject to displacement attributable to the α-axis turning motion and β-axis swing motion, and is able to move comparatively easily in the γ-axis turning motion.

We claim:

1. A wrist mechanism for an industrial robot, comprising:
   a first pipe extended from a first universal pipe coupling in relation to a front α-axis among three axes of motion of a wrist, on a first center axis (A—A) of a turning motion through a center of an α-axis reduction gear, said first universal pipe coupling located on said first center axis (A—A);
   a second universal pipe coupling provided in relation to a β-axis on a second center axis (B—B) of motion, said second universal pipe coupling located on said second center axis;
   a second pipe having one end connected to said first universal pipe coupling and the other end connected to said second universal pipe coupling;
   a hose extended along a support arm in relative to a third γ-axis driven by a first and a second drive shaft means, said hose extending from a rear end to a front end of said support arm, and connected through said second universal pipe coupling to said second pipe; and
   a connecting hose connected to an extremity of said first pipe;
   wherein said first pipe, said second pipe, and said second center axis are disposed near the front end of said support arm.

2. A wrist mechanism for an industrial robot according to claim 1, wherein the support arm is turned about said γ-axis on its rear end, and the connecting hose is connected through a third universal pipe coupling to said first pipe.

3. A wrist mechanism for an industrial robot according to claim 1, further comprising:
   a drive shaft rotatably mounted within said support arm.

4. A wrist mechanism for an industrial robot according to claim 1, further comprising:
   pipe moving means for remotely moving said first pipe in a three-axis motion.

5. A wrist mechanism for an industrial robot according to claim 4, wherein said pipe moving means comprises:
   first and second bevel gears, rotatably driven by said and second drive shaft means.

* * * * *